Patented May 11, 1948

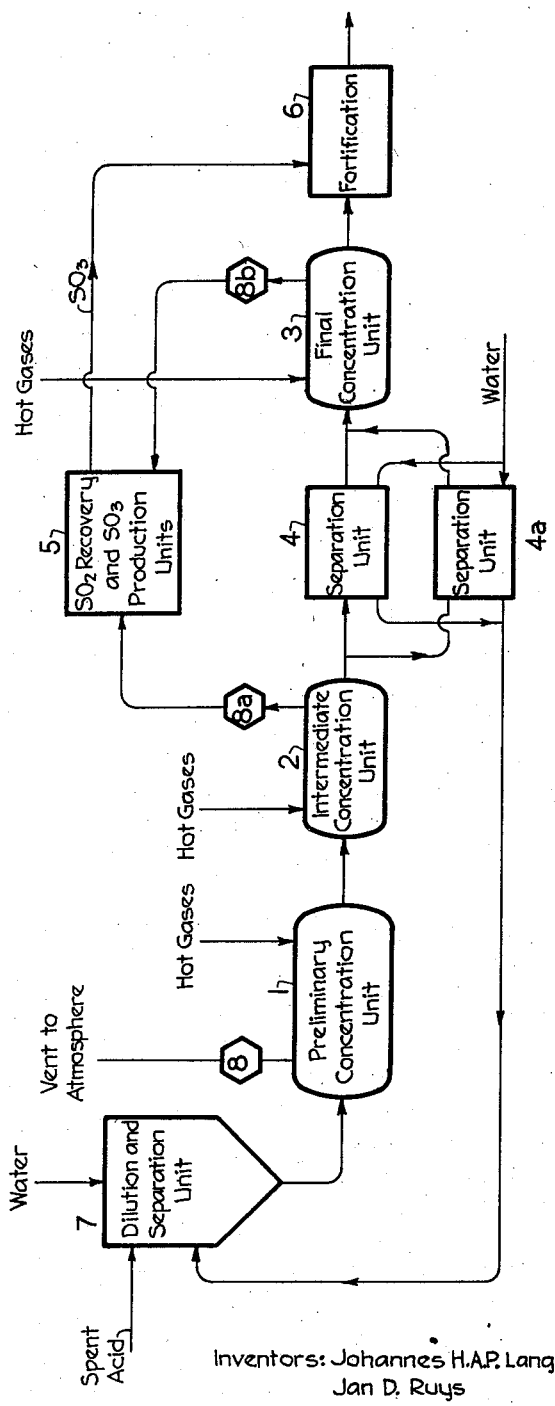

2,441,521

UNITED STATES PATENT OFFICE 2,441,521

ACID RECOVERY PROCESS

Johannes H. A. P. Langen van der Valk, Surbiton, England, and Jan D. Ruys, Berkeley, Calif., assignors to Shell Development Company, San Francisco, Calif., a corporation of Delaware Continuation of application Serial No. 385,900, March 29, 1941. This application August 17, 1944, Serial No. 549,888

6 Claims. (Cl. 23—173)

This invention relates to the treatment of inorganic acids which have become contaminated with organic impurities and particularly to the revivification of inorganic acid catalysts which have become inactivated by reaction with and/or absorption of such impurities. It deals with an improved procedure whereby such acids may be economically recovered in a form suitable for reuse as catalysts and is particularly applicable to the recovery of sulfuric acid which has become ineffective as a catalyst for the alkylation of hydrocarbons, particularly isoparaffins, with olefins.

An important object of the invention is to reduce the expense involved in recovering the inorganic acid content of acid containing organic impurities. Another object is to avoid loss of acid and to eliminate operating difficulties in the concentration of sulfuric acid. Still another object is to minimize undesirable decomposition of organic components of waste acid. Still another object is to provide a process particularly adapted for the recovery of spent alkylation acid. A further object is to provide a recovery process wherein sulfur dioxide evolved during the sulfuric acid concentration may be economically recovered. Other objects and advantages of the invention will be apparent from the following description.

All of the methods in use for the recovery of the acid content of sludge acid and the like are based upon oxidation and/or carbonization or some other method of decomposing the organic content and such decomposition has been regarded as advantageous at all stages of the treatment. The decomposition which takes place in storage preparatory to the recovery, if recognized at all, has apparently been regarded as more desirable than otherwise. It has now been found, however, that the changes which take place in the acid during storage at ordinary temperatures render the subsequent recovery of the acid more difficult and lead to loss of acid during such recovery. A commercially practical method has been developed whereby the difficulties due to such changes in the acid may be avoided and the recovery of the acid may be made more economical and efficient.

An important feature of the process of the invention comprises diluting the acid to be treated to reduce the concentration to a point at which undesirable reactions are substantially suppressed before any substantial amount of such reaction has taken place and under conditions at which such reactions are substantially avoided during dilution. Dilutions with steam and water have been used in the recovery of sulfuric acid from acid sludges such, for example, as are obtained in the refining of petroleum, etc. However, not only has such dilution usually been carried out after reactions in the acid have been allowed to progress to a detrimental extent but also no attempt has been made to control the dilution conditions so as to minimize undesirable reactions during dilution. In fact, heating or other treatment leading to undesirable reactions during dilution has been customary. In view of the fact that decomposition of organic impurities followed such dilution, it can be understood why it has not been regarded as of importance whether or not decomposition took place before, during or after dilution and why the advantageous increased yield and improved ease of acid recovery obtained by suppressing undesirable reactions before and during the dilution step of the invention were not realized before.

In order to make the invention clear it will be described in detail with particular reference to the recovery of sulfuric acid which has been used as a catalyst for the alkylation of isoparaffins by olefins as described, for example, in copending applications Serial No. 150,544, filed June 26, 1937, and Serial No. 276,062, filed May 27, 1939, now U. S. Patent No. 2,341,487. This application of the invention has been chosen as an illustration because it represents a particularly difficult acid recovery problem and also because it has been found, unexpectedly, that hydrocarbons having valuable drying properties may be obtained from spent alkylation acid by the process of the invention. To be effective as a catalyst for the alkylation of isoparaffins, sulfuric acid must be of relatively high concentration and small amounts of impurities in the acid may seriously interfere with the alkylation process so that revivification of such catalyst acid is a more exacting problem than recovery of the usual sludge acid.

The exact nature of the impurities present in spent sulfuric acid alkylation catalyst is not fully known and probably varies with the nature of the starting materials and conditions used in the alkylation process and such variables will influence the choice of operating conditions which will be most advantageous for carrying out the acid recovery process of the invention. In any case the acid being treated is promptly diluted, preferably under conditions at which substantial increase in temperature is avoided, with sufficient water to cause the separation of absorbed hydrocarbon impurities from the acid and the resulting mixture is stratified or subjected to other suitable treatment for separation of the resulting phases. Such dilution is preferably carried out within about eight hours and most preferably substantially immediately after the withdrawal of the acid from the alkylation system, although longer periods may be allowed to elapse without serious loss, particularly if the acid is kept at a suitably low temperature, for example 0° C. or below, at which no undesirable reaction takes place. Preferably the dilution is carried out with ice water or the like so as to avoid rise in temperature during dilution. Too high dilution is undesirable, because it leads to increased expense in subsequent reconcentration. For maximum separation of hydrocarbon impurities, dilution with such an amount of water will give an acid layer of about 35% to about 60%, preferably about 40% to 55%, is preferred although less dilution may be used especially where a suitable solvent for the hydrocarbons, such for example as a non-reactive hydrocarbon, as phenols or the like, is employed. Under suitable conditions 90 to 95% or more of the organic content of spent alkylation acid may be recovered as useful hydrocarbon.

The separation of hydrocarbon from dilute acid may be effected in any suitable manner. Stratification and decantation or centrifugation or the like may be used. If the dilution step has been properly carried out, prompt separation is not essential but as exposure of the hydrocarbon to the air leads to resinification of the constituents having drying properties, it is desirable to avoid such prolonged exposure as leads to loss of yield of desired drying oil. The separated hydrocarbon may be washed, first with water and then with a dilute aqueous base such as sodium hydroxide solution, to remove any remaining acidic bodies.

The dilute sulfuric acid remaining after the separation of the hydrocarbon is preferably reconcentrated according to the method illustrated in the acompanying figure which is a flow diagram showing the essential elements of the recovery system; for purposes of clarity pumps, heat exchangers, cooling units, bypasses, valves, vents and other auxiliary equipment have been omitted.

As described above, the spent acid is promptly diluted to about 50% concentration in the dilution and skimming unit 7 (referring to the flow diagram) from which dilute acid is continuously fed to the preliminary concentration unit 1, in which a body of acid is maintained within a given temperature range as set forth hereinafter. From the preliminary concentration unit acid is continuously passed into an intermediate concentration unit 2, also containing a body of acid maintained within a given temperature range. From the intermediate concentration unit 2 acid is continuously passed through a separation unit 4 and therefrom to a final concentration unit 3, which again contains a body of acid maintained within a given temperature range. In passing through the various concentration units the concentration of the acid is successively raised from about 50% to a value of the order of 92–95% in the final concentration unit 3.

If, as is the case where the acid is to be re-used for alkylation purposes, a concentration in excess of about 95% is desired, further concentration to 98% or more may be attained in the fortification unit 6.

The body of acid in each of the concentration units is preferably maintained within the desired temperature ranges by blowing hot gases therethrough in the known manner, the acid in preliminary concentration unit 1 being maintained within the range of about 120–140° C., corresponding to an acid concentration range of about 67–73% $H_2SO_4$; in the intermediate concentation unit 2 the preferred temperature range is about 160–185° C., corresponding to an acid strength range of about 80–85%; in the final concentration unit 3 the temperature is held within the approximate range of 210–140° C., corresponding to acid strengths with the approximate range of 92–95%.

In each case the dilute acid is preferably introduced either directly into the body of acid in the concentration unit or may be contacted with the vapors arising therefrom so as to be preheated thereby before dropping into the body of acid and at the same time precool the exit gases. However, other suitable methods of introduction may also be used. Cottrell precipitators or other suitable types of mist separators are provided at 8, 8a and 8b, in the gas exit lines of each of the concentration units.

Thus, in the operation of the recovery system, the spout alkylation acid is first passed to the dilution and skimming unit 7, wherein it is promptly diluted, the major portion of the hydrocarbons thereupon separating and being separately treated as previously described. Dilute acid is continuously fed from the dilution unit 7 to the preliminary concentration unit 1, the body of acid therein being maintained within the aforementioned temperature range of approximately 120–140° C. This temperature range is below both the foaming point of dilute alkylation acid and the point at which appreciable amounts of $SO_2$ are evolved.

Acid of a concentration of about 67–73% is continuously passed from 1 to the intermediate concentration unit 2 and into a body of acid at a tempertaure above the foaming point of the preliminarily concentrated acid and at or above the point at which oxidation and/or carbonization of the organic contaminants of the acid takes place, this point normally being between about 160 and 185° C. Within this temperature range introduction of dilute acid into the concentrator does not cause undue foaming, provided that the introduction be so regular and continuous as to permit the foam-forming material to be decomposed in a short time. Irregular or too rapid feeding causes an accumulation of foam-forming material and subsequent foaming in the concentrator. Thus, residence time is also a factor in the intermediate concentration unit; it has been found preferable to use a concentrator of sufficient size and a feed rate such that an average residence time of the order of 1½ to 3 hours in this unit is maintained. Temperature substantially over 185° C. should preferably be avoided during this step to avoid loss of acid due to oxidation of organic and/or carbonaceous matter separating in the unit. Further, the carbon separating during this stage has been found to be difficult to filter if temperatures appreciably in exces of 185° C. are utilized.

In the separation unit 4 organic impurities which have been converted to an insoluble form in intermediate concentration unit 2 are removed from the acid by filtration, skimming after stratification, centrifugation or other suitable methods. It having been found, surprisingly, that these insoluble impurities (principally carbon) contain as much as 15 times their weight or more sulfuric acid, apparently loosely bound chemically to the carbon, a second separation unit 4a is preferably provided. Thus, when filters are used as separation units, for example, acid leaving intermediate concentration unit 2 and containing insoluble impurities is passed through separation unit 4 until the separation becomes inefficient due to the size of the cake on the filter; the acid stream is thereupon bypassed through separation unit 4a, the filter cake in separation unit 4 meanwhile being backwashed with water to displace the sulfuric acid contained therein. The backwash water, including the recovered acid, is returned to dilution and separation unit 7. The two units 4 and 4a are thus used alternately for separation purposes and backwashed to recover the acid contained in the insoluble impurities, this acid being returned to the system in separation and dilution unit 7.

After removal of organic contaminants in separation unit 4 the acid is continuously passed into the final concentration unit 3, the acid leaving this unit being concentrated to about 92–95%. Further concentration with $SO_3$ in fortification unit 6 may be and is preferably carried out if the acid is to be re-used for alkylation purposes.

As a result of the above described 3-stage concentration method the exit gases from intermediate concentrator unit 2, and, in certain instances from final concentrator unit 3, will contain a sufficiently high concentration of $SO_2$ to make the recovery thereof economically feasible. These gases are therefore passed to $SO_2$ recovery and $SO_3$ production units 5 wherein the $SO_2$ is oxidized or otherwise processed to produce $SO_3$, which in turn may be utilized for fortification purposes in fortification unit 6.

The advantage of prompt dilution of the acid is shown by the following results of treatment of spent sulfuric acid from the alkylation at about 5° C. of isobutane with normal butylene.

| Sample | Acid Concentration after Dilution | Hydrocarbon Recovered by Dilution and Stratification in Per cent by Wt. | Total Carbon Content Separated by Dilution |
| --- | --- | --- | --- |
| | Per cent | Per cent | Per cent |
| Promptly Diluted | 47.2 | 6.5 | 88.5 |
| Allowed to React prior to dilution | 51.4 | 1.75 | 51.8 |

Each of the acids was concentrated by a three-stage continuous process. Acid of about 99% concentration was recovered as the final product in both cases. The product obtained from the acid which had not been promptly diluted contained 1.05% of its carbon content before dilution while by prompt dilution this figure was reduced to 0.4%. The loss of acid in the final concentration of the former was 5.74% compared with only 0.15% for the acid which had been promptly diluted. Further loss of acid, which was not measured, took place in the acid not promptly diluted as evidenced by the presence of a large amount of sulfur dioxide therein prior to dilution.

Several particular advantages in concentrating in the particular manner set forth herein may also be pointed out. For example, by concentrating in three stages, as described, foaming problems are completely eliminated, the formation of foam during concentration being heretofore one of the major problems in recovering spent alkylation acids. Further, the $SO_2$ recovery system provided permits commercial scale recovery and utilization of this material, which, in most existing acid concentration systems, is a primary disposal problem.

It is to be understood, of course, that the operating processes may be varied. Thus the process may be carried out batchwise, intermittently or continuously. In view of the high heat of dilution of concentrated sulfuric acid it is desirable to take suitable precautions to prevent local overheating as well as to provide means for rapidly dissipating the heat generated in the dilution step. Still other variations in the process may be made and the invention is not limited to the details disclosed by way of illustration nor by any theory proposed in explanation of the improved results which are obtained, but only by the terms of the accompanying claims.

The present application is a continuation of our copending application, Serial No. 385,900, filed March 29, 1941, and now forfeited.

We claim as our invention:

1. In a process for recovering and reconcentrating spent sulfuric acid which has been used as an alkylation catalyst in a form suitable for re-use as an alkylation catalyst, the steps comprising diluting said spent acid, substantially immediately after withdrawal of said acid from an alkylation system, to form two phases, a dilute aqueous acid phase and a hydrocarbon phase and thereafter concentrating said dilute aqueous acid phase in three stages, a first stage wherein said dilute acid is concentrated at a temperature immediately below the foaming point of said acid, a second stage wherein said dilute acid is concentrated at a temperature above the foaming point of said dilute acid and at a temperature whereat organic contaminants remaining in said dilute acid are decomposed and thus rendered insoluble therein but below the temperature at which appreciable reaction takes place between the acid and organic contaminants rendered insoluble during said second concentration stage and a third stage wherein the acid is concentrated at a temperature corresponding approximately to the boiling point of sulfuric acid at the desired final concentration, the organic contaminants rendered insoluble in the second stage being removed from said acid between the second and third stages.

2. In a process for recovering and reconcentrating spent sulfuric acid which has been used as an alkylation catalyst in a form suitable for re-use as an alkylation catalyst, the steps comprising promptly diluting said spent acid with sufficient water to cause formation of a hydrocarbon phase and a phase containing aqueous sulfuric acid of 40% to about 55% concentration at a temperature at which substantial reaction of said hydrocarbon and said acid is avoided, separating said hydrocarbon phase and said dilute acid phase, continuously feeding said dilute acid into a first body of sulfuric acid maintained within the approximate temperature range of 120–140° C., continuously feeding acid from said first body of acid into a second body of acid maintained within the approximate temperature range of 160–185° C. whereupon organic contaminants remaining in said acid are decomposed and thus rendered insoluble therein, separating said insoluble organic contaminants from said second body of acid and continuously feeding the acid separated from said organic contaminants into a third body of acid maintained within the approximate temperature range of 210–240° C.

3. In a method for reconcentrating dilute sulfuric acid which has been used as an alkylation catalyst in a form suitable for re-use in an alkylation process, the steps comprising promptly diluting said spent acid with sufficient water to cause formation of a hydrocarbon phase and a phase containing dilute sulfuric acid of 40% to about 55% concentration at a temperature at which substantial reaction between said hydrocarbon phase and said dilute acid phase is avoided, feeding said dilute acid into a preliminary concentration unit containing a body of acid maintained within the approximate temperature range of 120–140° C., feeding acid from said preliminary concentration unit to an intermediate concentration unit containing a body of acid maintained within the approximate temperature range of 160–185° C. whereupon organic contaminants remaining in said acid are decomposed and thus rendered insoluble therein, feeding acid from said intermediate concentration unit to a final concentration unit containing a body of acid maintained within the approximate temperature range of 210–240° C., the temperature of the body of acid in each of said units being maintained by blowing hot gases therethrough, insoluble material present in the acid leaving said intermediate concentration unit being separated from said acid before feeding said acid to the final concentration unit and recovering sulfur dioxide from the exit gases leaving said intermediate and final concentration units.

4. In a process for recovering and reconcentrating spent sulfur acid which has been used as an alkylation catalyst in a form suitable for re-use as an alkylation catalyst, the steps comprising promptly diluting said spent acid with sufficient water to cause formation of a hydrocarbon phase and a phase containing aqueous sulfuric acid of 20% to about 55% concentration at a temperature at which substantial reaction of said hydrocarbon and said acid is avoided, feeding said dilute acid into a preliminary concentration unit containing a body of acid maintained within the approximate temperature range of 120–140° C., feeding acid from said preliminary concentration unit to an intermediate concentration unit containing a body of acid maintained within the approximate temperature range of 160–185° C. whereupon organic contaminants remaining in said acid are rendered insoluble therein, feeding acid from said intermediate concentration unit to a final concentration unit containing a body of acid maintained within the approximate temperature range of 210–240° C., the temperature of the body of acid in each of said units being maintained by blowing hot gases, therethrough, insoluble material present in the acid leaving said intermediate concentration unit being separated from said acid before feeding said acid to the final concentration unit, feeding acid from said final concentration unit to a fortification unit and therein fortifying said acid with sulfur trioxide, recovering sulfur dioxide from the exit gases leaving said intermediate and final concentration units, processing said sulfur dioxide to form sulfur trioxide and supplying said sulfur trioxide to said fortification unit.

5. In a process for recovering and reconcentrating spent sulfuric acid which has been used as an alkylation catalyst in a form suitable for re-use as an alkylation catalyst, the steps comprising promptly diluting said spent acid with sufficient water to cause formation of a hydrocarbon phase and a phase containing aqueous sulfuric acid of 40% to about 55% concentration at a temperature at which substantial reaction of said hydrocarbon and said acid is avoided, separating said hydrocarbon phase and said dilute acid phase, continuously feeding said dilute acid into a first body of sulfuric acid maintained within the approximate temperature range of 120–140° C., continuously feeding acid from said first body of acid into a second body of acid maintained within the approximate temperature range of 160–185° C. whereupon organic contaminants remaining in said acid are rendered insoluble therein, separating said insoluble organic contaminants from said second body of acid, water washing said insoluble impurities to recover sulfuric acid retained therein, returning said recovered sulfuric acid to said dilute feed acid and continuously feeding the acid separated from said organic contaminants into a third body of acid maintained within the approximate temperature range of 210–240° C.

6. In a process for recovering and reconcentrating spent sulfuric acid which has been used as an alkylation catalyst in a form suitable for re-use as an alkylation catalyst, the steps comprising promptly diluting said spent acid with sufficient water to cause formation of a hydrocarbon phase and a phase containing aqueous sulfuric acid of 20% to about 55% concentration at a temperature at which substantial reaction of said hydrocarbon and said acid is avoided, feeding said dilute acid into a preliminary concentration unit containing a body of acid maintained within the approximate temperature range of 120–140° C., feeding acid from said preliminary concentration unit to an intermediate concentration unit containing a body of acid maintained within the approximate temperature range of 160–185° C. whereupon organic contaminants remaining in said acid are rendered insoluble therein, feeding acid from said intermediate concentration unit to a final concentration unit containing a body of acid maintained within the approximate temperature range of 210–240° C., the temperature of the body of acid in each of said units being maintained by blowing hot gases therethrough, insoluble material present in the acid leaving said intermediate concentration unit being separated from said acid before feeding said acid to the final concentration unit, said separation being carried out in a filtration unit, said filtration unit being periodically backwashed with water to recover sulfuric acid retained in said insoluble material, said recovered sulfuric acid being returned to the system in said aforementioned dilute feed acid, feeding acid from said final concentration unit to a fortification unit and therein fortifying said acid with sulfur trioxide, recovering sulfur dioxide to form sulfur trioxide and supplying said sulfur trioxide to said fortification unit.

JOHANNES H. A. P. LANGEN VAN DER VALK.
JAN D. RUYS.

REFERENCES CITED

The following references are of record in the file of this patent:

UNITED STATES PATENTS

| Number | Name | Date |
|---|---|---|
| 1,991,745 | Hechenbleikner | Feb. 19, 1935 |
| 2,111,920 | Wells | Mar. 22, 1938 |
| 2,287,732 | Frey | Jan. 23, 1942 |

Certificate of Correction

Patent No. 2,441,521.  May 11, 1948.

JOHANNES H. A. P. LANGEN van der VALK ET AL.

It is hereby certified that error appears in the printed specification of the above numbered patent requiring correction as follows: Column 7, line 36, claim 4, for the word "sulfur" read *sulfuric*; and that the said Letters Patent should be read with this correction therein that the same may conform to the record of the case in the Patent Office.

Signed and sealed this 3rd day of August, A. D. 1948.

[SEAL]

THOMAS F. MURPHY,
*Assistant Commissioner of Patents.*